(12) United States Patent
Moll et al.

(10) Patent No.: US 7,861,363 B2
(45) Date of Patent: Jan. 4, 2011

(54) BEAM BLADE WINDSHIELD WIPER ASSEMBLY HAVING AN AIRFOIL

(75) Inventors: Kyle Moll, Oxford, MI (US); Rolando Lozano, Oxford, MI (US)

(73) Assignee: Trico Products Corporation, Rochester Hill, MI (US)

( * ) Notice: Subject to any disclaimer, the term of this patent is extended or adjusted under 35 U.S.C. 154(b) by 1373 days.

(21) Appl. No.: 11/345,930

(22) Filed: Feb. 2, 2006

(65) Prior Publication Data

US 2007/0174989 A1 Aug. 2, 2007

(51) Int. Cl.
 *B60S 1/38* (2006.01)
(52) U.S. Cl. .............................. 15/250.201; 15/250.43
(58) Field of Classification Search ............ 15/250.201, 15/250.43, 250.361, 250.451, 250.44
 See application file for complete search history.

(56) References Cited

U.S. PATENT DOCUMENTS

| | | | | |
|---|---|---|---|---|
| 2,799,887 A | 7/1957 | Nemic | .......................... | 15/255 |
| 2,814,820 A | 12/1957 | Elliott et al. | .................. | 15/245 |
| 2,937,393 A | 5/1960 | Brueder | ........................ | 15/245 |
| 3,037,233 A | 6/1962 | Peras et al. | ............. | 15/250.42 |
| 3,056,991 A | 10/1962 | Smithers | .................. | 15/250.41 |
| 3,082,464 A | 3/1963 | Smithers | .................. | 15/250.42 |
| 3,088,155 A | 5/1963 | Smithers | .................. | 15/250.42 |
| 3,089,174 A | 5/1963 | Bignon | ..................... | 15/250.36 |
| 3,234,578 A | 2/1966 | Golub et al. | ............. | 15/250.42 |
| 3,296,647 A | 1/1967 | Gumbleton | ............. | 15/250.04 |
| 3,317,946 A | 5/1967 | Anderson | ................ | 15/250.42 |
| 3,350,738 A | 11/1967 | Anderson | ................ | 15/250.42 |
| D211,570 S | 7/1968 | Tomlin | ......................... | D14/6 |
| 3,418,679 A | 12/1968 | Barth et al. | .............. | 15/250.36 |
| 3,618,155 A | 11/1971 | Mower | ..................... | 15/250.42 |
| 3,665,544 A | 5/1972 | Sakamoto | ................ | 15/250.42 |
| 3,673,631 A | 7/1972 | Yamadai et al. | .......... | 15/250.42 |
| 3,685,086 A | 8/1972 | Froehlich | .................... | 15/250.2 |
| 3,862,465 A | 1/1975 | Ito | .......................... | 15/250.42 |
| 3,879,793 A | 4/1975 | Schlegel | .................. | 15/250.42 |
| 4,309,790 A | 1/1982 | Bauer et al. | .............. | 15/250.42 |
| D267,939 S | 2/1983 | Duvoux | ..................... | D12/155 |
| D268,020 S | 2/1983 | Duvoux | ..................... | D12/155 |
| 4,400,845 A | 8/1983 | Noguchi et al. | .......... | 15/250.42 |
| 4,422,207 A | 12/1983 | Maiocco et al. | .......... | 15/250.42 |
| 4,438,543 A | 3/1984 | Noguchi et al. | .......... | 15/250.42 |

(Continued)

FOREIGN PATENT DOCUMENTS

DE 10335393 A1 9/2004

(Continued)

*Primary Examiner*—Gary K Graham
(74) *Attorney, Agent, or Firm*—Bliss McGlynn, P.C.

(57) ABSTRACT

A beam blade wiper assembly including a rubber wiping element and an elongated beam having first and second longitudinal ends. The wiper assembly also includes an airfoil having an attachment portion and an upper portion extending between first and second distal ends. The attachment portion includes a flat rib and a pair of legs adapted to operatively engage the rubber wiping element. The upper portion includes a solid base having a leading edge that extends from the base toward the wiping element. The base and the rib define a space that receives the elongated beam. The base and the elongated beam define a cavity that provides flexibility between the upper portion and the attachment portion during wiper operation. The upper portion further includes a spoiler that extends from the base in a manner opposite to the leading edge.

10 Claims, 3 Drawing Sheets

U.S. PATENT DOCUMENTS

| | | | | |
|---|---|---|---|---|
| 4,464,808 A | 8/1984 | Berry | ................ | 15/250.2 |
| 4,547,925 A | 10/1985 | Blackborow et al. | ...... | 15/250.42 |
| 4,561,143 A | 12/1985 | Beneteau | ................ | 15/250.42 |
| 4,570,284 A | 2/1986 | Verton | ................ | 15/250.42 |
| 4,590,638 A | 5/1986 | Beneteau | ................ | 15/250.42 |
| 4,741,071 A | 5/1988 | Bauer et al. | ................ | 15/250.42 |
| 4,766,636 A | 8/1988 | Shinpo | ................ | 15/250.42 |
| 4,782,547 A | 11/1988 | Mohnach | ................ | 15/250.04 |
| 4,852,206 A | 8/1989 | Fisher | ................ | 15/250.42 |
| D307,408 S | 4/1990 | Mower et al. | ................ | D12/155 |
| D308,660 S | 6/1990 | Fisher | ................ | D12/155 |
| D308,845 S | 6/1990 | Charet et al. | ................ | D12/155 |
| 4,976,001 A | 12/1990 | Wright | ................ | 15/250.2 |
| 4,984,325 A | 1/1991 | Arai et al. | ................ | 15/250.2 |
| 4,989,290 A | 2/1991 | Hoshino | ................ | 15/250.42 |
| 5,042,106 A | 8/1991 | Maubray | ................ | 15/250.2 |
| 5,086,534 A | 2/1992 | Journee | ................ | 15/250.2 |
| 5,093,954 A | 3/1992 | Kuzuno | ................ | 15/250.42 |
| 5,138,739 A | 8/1992 | Maubray | ................ | 15/250.42 |
| 5,168,596 A | 12/1992 | Maubray | ................ | 15/250.2 |
| 5,170,527 A | 12/1992 | Lyon, II | ................ | 15/250.42 |
| 5,179,761 A | 1/1993 | Buechele et al. | ................ | 15/250.42 |
| 5,206,969 A | 5/1993 | Patterson et al. | ................ | 15/250.42 |
| 5,218,735 A | 6/1993 | Maubray | ................ | 15/250.42 |
| 5,228,167 A | 7/1993 | Yang | ................ | 15/250.39 |
| 5,233,721 A | 8/1993 | Yang | ................ | 15/250.39 |
| 5,257,436 A | 11/1993 | Yang | ................ | 15/250.4 |
| 5,276,937 A | 1/1994 | Lan | ................ | 15/257.01 |
| 5,283,925 A | 2/1994 | Maubray | ................ | 15/250.2 |
| 5,311,636 A | 5/1994 | Lee | ................ | 15/250.42 |
| 5,319,826 A | 6/1994 | Mower | ................ | 15/250.42 |
| 5,383,249 A | 1/1995 | Yang | ................ | 15/250.42 |
| 5,392,489 A | 2/1995 | Mohnach | ................ | 15/250.42 |
| 5,454,135 A | 10/1995 | Okuya et al. | ................ | 15/250.42 |
| 5,463,790 A | 11/1995 | Chiou et al. | ................ | 15/250.29 |
| 5,509,166 A | 4/1996 | Wagner et al. | ................ | 15/250.44 |
| 6,292,974 B1 | 9/2001 | Merkel et al. | ................ | 15/250.201 |
| 6,523,218 B1 | 2/2003 | Kotlarski | ................ | 15/250.201 |
| 6,550,096 B1 | 4/2003 | Stewart et al. | ................ | 15/250.32 |
| 6,675,433 B1 | 1/2004 | Stewart et al. | ................ | 15/250.43 |
| 6,675,434 B1 | 1/2004 | Wilhelm et al. | ................ | 15/250.454 |
| 6,836,924 B2 | 1/2005 | Egan-Walter | ................ | 15/250.04 |
| 6,836,926 B1 | 1/2005 | De Block | ................ | 15/250.43 |
| 6,944,905 B2 | 9/2005 | De Block et al. | ................ | 15/250.201 |
| 2002/0133897 A1 | 9/2002 | De Block et al. | ................ | 15/250.201 |
| 2003/0159229 A1 | 8/2003 | Weiler et al. | ................ | 15/250.201 |
| 2004/0098821 A1 | 5/2004 | Kraemer et al. | ................ | 15/250.201 |
| 2004/0181894 A1 | 9/2004 | Lee et al. | ................ | 15/250.201 |
| 2006/0282972 A1* | 12/2006 | Huang | ................ | 15/250.201 |

FOREIGN PATENT DOCUMENTS

| | | |
|---|---|---|
| WO | WO 02/087935 A1 | 11/2002 |
| WO | WO 2004/076251 A1 | 9/2004 |
| WO | WO 2004/076252 A1 | 9/2004 |

\* cited by examiner

BEAM BLADE WINDSHIELD WIPER ASSEMBLY HAVING AN AIRFOIL

BACKGROUND OF THE INVENTION

1. Field of the Invention

The present invention relates, generally, to windshield wiper assemblies and, more specifically, to a beam blade windshield wiper assembly having improved wind lift characteristics.

2. Description of the Related Art

Conventional windshield wiper assemblies known in the related art generally consist of two types commonly referred to as "beam blade windshield wiper assemblies" and "tournament windshield wiper assemblies." Both types of windshield wiper assemblies include a wiping element that contacts the windshield or surface to be wiped. Further, both types of windshield wiper assemblies are carried across the windshield by a wiper arm and rely on the downward force from the wiper arm to maintain contact between the wiping element and the windshield. However, tournament-style windshield wiper assemblies depend on a series of levers to distribute the downward force from the wiper arm across the wiping element.

On the other hand, beam blade windshield wiper assemblies include an elongated, homogeneous strip forming a spring backbone or beam that is resiliently flexible. The beam is curved along a single plane that flexes to correspond to the curvature of a windshield. A wiper arm delivers a downward force to the beam that is distributed across the beam, thereby pressing the wiper assembly into contact with the windshield. An example of a beam blade type windshield wiper assembly is described in U.S. Pat. No. 6,550,096 issued Apr. 22, 2003 to Stewart et al. and assigned to Trico Products Corp.

Beam blade windshield wiper assemblies include a smaller profile and less moving parts than tournament windshield wiper assemblies. Thus, as a matter of aesthetics, beam blade windshield wiper assemblies are generally preferred over tournament windshield wiper assemblies. However, due to the general characteristics of beam blade windshield wiper assemblies, they are more likely to be subjected to a phenomenon referred to as "wind lift." Generally speaking, wind lift occurs when airflow underneath the windshield wiper assembly creates a lift force greater than the opposing downward forces of the wiper arm and airflow over the assembly. During wind lift, the windshield wiper assembly lifts from the windshield of the vehicle, which can decrease the effectiveness of the windshield wiper assembly to clean the windshield.

To counter wind lift, airfoils of various designs have been employed to combat this problem. Airfoils create a downward force that presses the windshield wiper assembly into contact with the windshield, even at elevated driving speeds where wind lift can be extreme. While the beam blade windshield wiper assemblies known in the art provide significant advances in the related technology, there continues to be a need in the art for improvements in beam blade windshield wiper assemblies, which result in improved performance at variable vehicle speeds, and reduce wind lift with simplicity of parts and reduction in manufacturing costs.

As a result, there is a need in the art for a beam blade windshield wiper assembly that that includes an airfoil for improved wiping performance at variable vehicular speeds. Further, there is a need in the art for a beam blade windshield wiper assembly having an airfoil that simpler to manufacture and assemble to thereby reduce manufacturing and assembly costs.

SUMMARY OF THE INVENTION

The present invention overcomes many limitations and disadvantages in the related art in beam blade windshield wiper assemblies for use in connection with an automotive vehicle. To this end, the beam blade windshield wiper assembly of the present invention includes a rubber wiping element adapted to contact a surface to be wiped and an elongated beam having first and second longitudinal ends. The beam is a resiliently flexible material that is adapted to apply a force from an intermediate position between the first and second longitudinal ends to the first and second longitudinal ends. The beam blade wiper assembly further includes an airfoil having an attachment portion and an upper portion extending between first and second distal ends. The attachment portion is integrally attached to the upper portion and includes a flat rib and a pair of legs depending therefrom. The legs are adapted to operatively engage a portion of the rubber wiping element. The upper portion includes a solid base having a leading edge that extends from the base toward the wiping element. The base is spaced from the rib so as to define a space therebetween that is adapted to receive the elongated beam. The base and the upper surface of the elongated beam cooperate to further define a cavity adapted to provide flexibility between the upper portion and the attachment portion during operational movement across the surface to be wiped. The upper portion further includes a spoiler that extends from the base in a manner opposite to the leading edge to reduce the likelihood of wind lift.

Another embodiment of the beam blade windshield wiper assembly of the present invention includes a rubber wiping element adapted to contact a surface to be wiped and an elongated beam having an upper surface and a lower surface extending between first and second longitudinal ends. The beam is a resiliently flexible material adapted to apply a force from an intermediate position between the first and second longitudinal ends to the first and second longitudinal ends. The beam blade windshield wiper assembly further includes a retainer including a plate and a pair of legs depending from the plate to operatively engage a portion of the rubber wiping element. The retainer further includes a pair of arms extending from the plate in a manner opposite to the legs. The arms are adapted to operatively engage a portion of the elongated beam. The beam blade windshield wiper assembly further includes an airfoil having an attachment portion and an upper portion extending between first and second distal ends. The attachment portion is integrally attached to the upper portion and is operatively attached to the retainer. The attachment portion and the elongated beam cooperate to define a cavity adapted to provide flexibility between the airfoil and the retainer during operational movement across the surface to be wiped. The upper portion includes a solid base having a leading edge that extends from the base toward the wiping element. The upper portion further includes a spoiler that extends from the base in a manner opposite to the leading edge to reduce the likelihood of wind lift.

Thus, one advantage of the present invention is that the beam blade windshield wiper assembly includes an airfoil that reduces wind lift for improved wiping performance.

Another advantage of the present invention is that the beam blade windshield wiper assembly includes a solid airfoil that includes fewer parts, is simpler to manufacture and that results in reduced manufacturing costs.

Still another advantage of the present invention is that the beam blade windshield assembly includes a cavity that provides increased flexibility of the airfoil during operational movement and thereby reduces wind lift.

BRIEF DESCRIPTION OF THE DRAWINGS

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
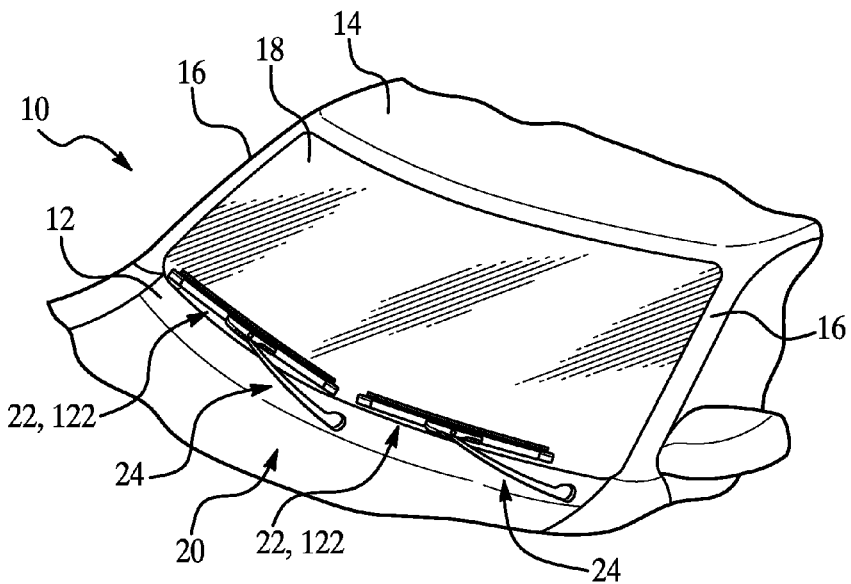
FIG. 1 is a partial perspective view of the front of an automotive vehicle having a pair of beam blade windshield wiper assemblies, according to an embodiment of the present invention, pivotally mounted for reciprocal movement across the windshield of the vehicle.

Referring now to the figures, where like numerals are used to designate like structure, a portion of a vehicle is illustrated at 10 in FIG. 1. The vehicle body includes a cowl 12, a roof 14, and a pair of laterally spaced front or "A" pillars 16 extending between the roof 14 and the cowl 12. The A-pillars 16, roof 14, and cowl 12 cooperate to define a generally rectangular perimeter, which supports a curved or "swept back" windshield 18.

A windshield wiper system is generally indicated at 20 in FIG. 1 and is employed to clean the glass windshield 18. The windshield wiper system 20 includes a pair of beam blade windshield wiper assemblies of the present invention, generally indicated at 22, and which correspond to the driver and passenger side of the vehicle 10. Each beam blade windshield wiper assembly 22 (hereinafter "wiper assembly") is carried by a corresponding wiper arm assembly, generally indicated at 24. The wiper arm assembly 24 includes an attachment member (not shown but generally known in the art) adapted to operatively engage a wiper assembly 22. An electrical motor (not shown but generally known in the art) is employed to power the wiper system 20 to move the windshield wiper assemblies 22 in an oscillating manner across the surface of the windshield 18.

While the wiper assembly 22 illustrated in FIG. 1 is shown in connection with the front windshield 18 of the vehicle 10, those having ordinary skill in the art will appreciate that wiper assemblies 22 may be employed in other areas of a vehicle 10, such as a rear window (not shown) or a head lamp (not shown) that employs a wiper system 20. Thus, it will be understood that the present invention is not limited for use solely in connection with wiper arm assemblies 24 and windshield wiper assemblies 22 adapted for use on a vehicle's windshield 18, but for use in all applications where wiper arm assemblies 24 and wiper assemblies 22 are employed.

Figure 2:
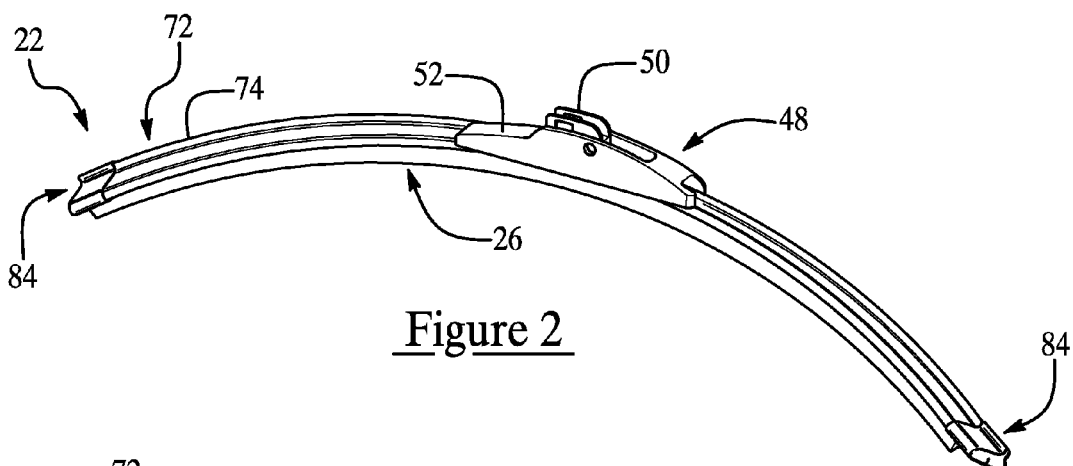
FIG. 2 is a perspective view of the beam blade wiper assembly according to an embodiment of the present invention.
Figure 3:
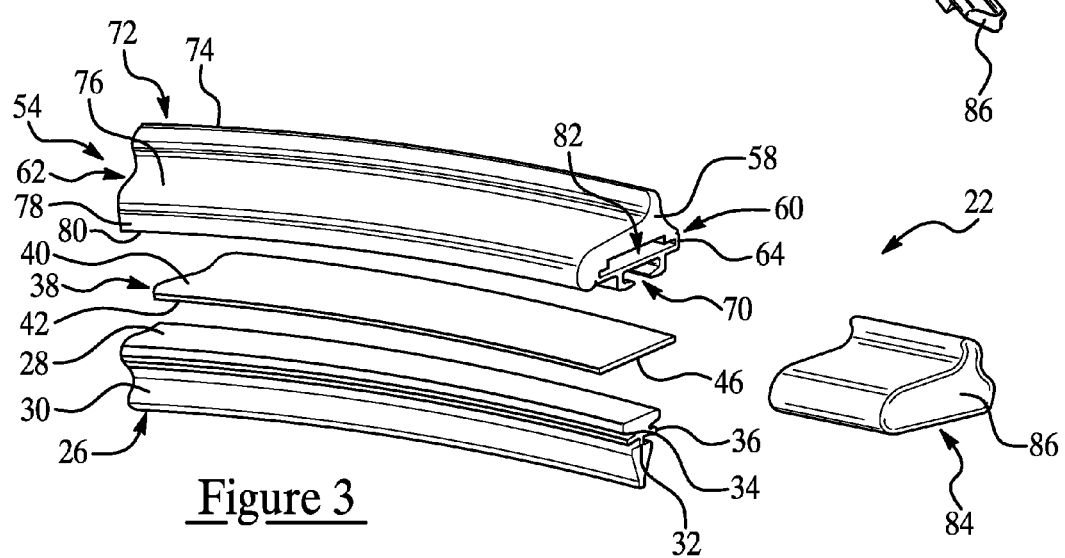
FIG. 3 is a fragmentary perspective view of a partially assembled beam blade wiper assembly according to an embodiment of the present invention.
Figure 4:
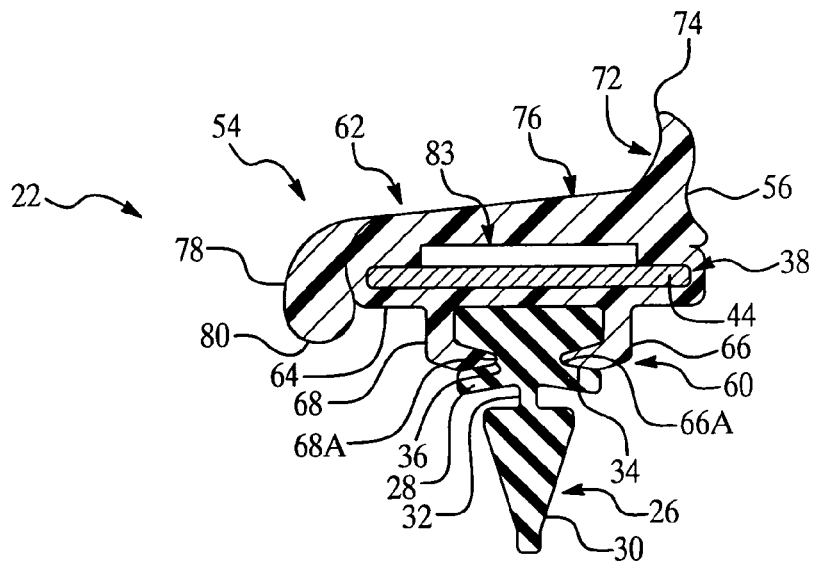
FIG. 4 is a cross-sectional view of the beam blade wiper assembly according to an embodiment of the present invention.

Referring to FIGS. 2-4, the wiper assembly 22 includes a rubber wiping element, generally indicated at 26, that is adapted to contact the surface of the vehicle 10 to be wiped, namely the windshield 18. The rubber wiping element 26 includes an upper section 28 and a lower section 30 that are partitioned by a longitudinally extending beam 32. The beam 32 provides flexibility between the upper section 28 and lower section 30 during operational movement of the wiper assembly 22 across the surface to be wiped. The upper section 28 further includes first and second channels 34 and 36, respectively, to facilitate attachment to additional components of the wiper assembly 22, as described in greater detail below. The rubber wiping element 26 includes a predetermined length corresponding to particular application and is manufactured through an extrusion process, which enables the length of the wiping element 26 to be easily adjusted without a substantial increase to manufacturing expense. Furthermore, while the rubber wiping element 26 of the present invention is constructed from a flexible rubber, those having ordinary skill in the art will appreciate that it may be constructed from any flexible material such as silicone or other polymer without departing from the scope of the invention.

Referring specifically to FIGS. 3 and 4, the windshield wiper assembly 22 further includes an elongated beam, generally indicated at 38. The elongated beam 38 includes an upper surface 40 and a lower surface 42 that extend between first and second longitudinal ends 44 and 46, respectively. The elongated beam is constructed from a resiliently flexible material, such as spring steel or a polymer, and is adapted to apply force from an intermediate position between the first and second longitudinal ends 44 and 46 to the first and second longitudinal ends 44 and 46. More specifically, the elongated beam 38 receives force from the spring-loaded wiper arm assembly 24 at an intermediate position and distributes this force across the span of the elongated beam 38 toward the first and second longitudinal ends 44 and 46. To that end, the elongated beam 38 is curved longitudinally with a predetermined radius of curvature parallel to the plane of curvature of the windshield 18 and is sometimes referred to in the related art as a "free form" radius of curvature (hereinafter "windshield curvature"). Accordingly, the curvature of the elongated beam 38 may be symmetrical or asymmetrical depending on the force requirements and the contour of the windshield 18. The flexible, free form, pre-curved beam straightens out when the wiper arm assembly 24 applies a force thereto to flatten the beam 38 and directs the rubber wiring element 26 to contact the windshield 18. Thus, the elongated beam 38 includes a free-form curvature that ensures force distribution on windshields having various curvatures that effects proper wrapping about the windshield 18.

As illustrated in throughout the figures, the elongated beam 38 has a substantially constant width and may have a constant thickness throughout the length between the first and second longitudinal ends 44 and 46. The constant width and thickness are adapted to provide high lateral and torsional stiffness to avoid lateral and torsional deflection, which causes the rubber wiping element 26 to stick/slip ("chatter") on the windshield 18 during operation. Thus, the cross-section of the beam 38 has a generally rectangular outer profile which makes the elongated beam 38 easier to manufacture. More specifically, where the elongated beam 38 is constructed from metal, such as spring steel, the tools and machinery used to manufacture the elongate beam 38 are less complicated than that required to manufacture elongated beams having varying widths and/or thicknesses. Furthermore, where the elongated beam 38 is constructed from a polymer, such as a thermoplastic elastomer, the tools and extrusion process machinery are also less complicated than those employed to manufacture elongated beams having varying widths and/or thicknesses. However, those having ordinary skill in the art will appreciate that the elongated beam 38 of the present invention may include a varying thickness and/or width without departing from the scope of the invention. By way of example, the width and/or thickness of the elongated beam 38 may taper linearly from the beam center, sinusoidally, parabolically, or asymmetrically. Additionally, the elongated beam 38 is illustrated throughout the figures as a single, integral piece of material such that it defines a consolidated cross-section. However, those having ordinary skill in the art will appreciate that the elongated beam 38 may be formed into a single piece by a plurality of laminates.

Referring to FIG. 2, the wiper assembly 22 further includes a connecting member, generally indicated at 48. The connecting member 48 is adapted to connect the wiper assembly 22 to the attachment member of a wiper arm assembly 24. More specifically, the connecting member 48 includes a coupler 50 that operatively engages the attachment member of a wiper arm assembly 24. Those having ordinary skill in the art will appreciate that the coupler 50 includes structure that corresponds to at least one particular type of wiper arm assembly attachment member, but may include structure that corresponds to multiple types of wiper arm assembly attachment members. By way of example, different OEM's employ wiper arm assemblies having different attachment members adapted to operatively engage a specific beam blade wiper assembly. Accordingly, the connecting member 48 of the present invention includes a coupler 50 having structure that operatively engages at least one or more of these different attachment members. Further by way of example, certain wiper arm assemblies employed by OEM's include attachment members commonly referred to as "bayonet-style"; "pin-type"; or "hook-type" attachment members that operatively engage "tournament style" wiper assemblies. Accordingly, the coupler 50 of the connecting member 48 of the present invention may include structure for operatively engaging at least one or more of these different attachment members for use in connection with tournament-style wiper assemblies without departing from the scope of the invention.

The connecting member 48 further includes a carrier 52 that is operatively attached to the wiper assembly 22, as described in greater detail below. The coupler 50 is pivotally attached to the carrier 52. Those having ordinary skill in the art will appreciate that while the coupler 50 is pivotally attached to the carrier 52, the coupler 50 may be attached in a pivotally fixed manner or may be removable from the carrier 52 to provide a wiper assembly having interchangeable couplers 50 that accommodate different attachment members, as described above. Contrary to conventional beam blade wiper assemblies, which include a small contact point through which force from the wiper arm assembly is distributed, the carrier 52 of the present invention broadens the initial point at which force is applied from the wiper arm assembly 24 to the elongated beam 38. In this manner, the downward force from the wiper arm assembly 24 is distributed with more efficiency to the longitudinal ends 44 and 46 of the elongated beam 38, thereby reducing chatter and improving wiping action.

Referring back to FIGS. 2-4, the wiper assembly 22 further includes an airfoil, generally indicated at 54, that acts to reduce the likelihood of wind lift. The airfoil 54 includes first and second distal ends 56, 58. The airfoil 54 further includes an attachment portion, generally indicated at 60, and an upper portion generally indicated at 62. The attachment portion 60 is integrally attached to the upper portion 62. More specifically, the airfoil 54 is manufactured through an extrusion process wherein the attachment portion 60 and the upper portion 62 are simultaneously formed from the same thermoplastic material.

The attachment portion 60 includes a flat rib 64 and a pair of legs 66, 68 depending from the flat rib. The legs 66, 68 are adapted to operatively engage a portion of the rubber wiping element 26. More specifically, each of the legs 66, 68 include a chamfered end 66A, 68A that is turned inward toward each other such that the legs 66, 68 and the flat rib 64 cooperate to define a sleeve 70 that retains the upper section 28 of the rubber wiping element 26. As shown in FIG. 4, the legs 66, 68 operatively engage the passages 34, 36 within the upper section 28 of the rubber wiping element 26. Those having ordinary skill in the art will appreciate that while the attachment portion 60 of the airfoil 54 includes legs 66, 68 having chamfered ends 66A, 68A to operatively engage the rubber wiping element 26, the attachment portion 60 of the airfoil 54 may include any structure adapted to accomplish this end without departing from the scope of the invention.

With continuing reference to FIGS. 3 and 4, the upper portion 62 includes a spoiler generally indicated at 72. The spoiler 72 is adapted to reduce the likelihood of wind lift by utilizing airflow to generate downward force on to the wiper assembly 22. To this end, the spoiler 72 is solid in cross-section and includes a terminal point 74. More specifically, the spoiler 72 tapers inwardly from the base, described in greater detail below, toward the terminal point 74 to define a profile that is slightly contoured (FIG. 4). The spoiler 72 is integrally attached to the upper portion 62 in a manner described above relative to the integral attachment between the upper portion 62 and the attachment portion 60. However, those having ordinary skill in the art will appreciate that while the spoiler 72 is integrally attached as describe above, the spoiler 72 may be manufactured during a separate process and subsequently attached to the upper portion 62 by an adhesive, ultrasonic welding, or by structure, such as tongue and groove, located within the spoiler 72 and the upper portion 62.

The upper portion 62 further includes a solid base 76 having a leading edge 78 that extends from the base 76 toward the wiping element 26. As shown in FIG. 4, the leading edge 78 of the base 76 further includes a terminal end 80 that acts to direct airflow toward the spoiler 72. More specifically, in one preferred embodiment, the terminal end 80 may extend outward and below the flat rib 64 to reduce or eliminate airflow beneath the rubber wiping element 26 and therefore wind lift on the wiper assembly 22. The base 76 of the upper portion 62 extends from the leading edge 78 to the spoiler 72 on an incline to further direct airflow toward the spoiler 72 (FIG. 4).

The base 76 is spaced from the flat rib 64 to define a space 82 therebetween (FIG. 3). The space 82 is adapted to receive the elongated beam 38 (FIG. 4). As illustrated in FIG. 4, the elongated beam 38 and the base 76 cooperate to define a cavity 83. The cavity 83 is adapted to provide increased flexibility between the upper portion 62 and the attachment portion 60 during operational movement of the wiper assembly 22 across the windshield 18. More specifically, during operational movement of the wiper assembly 22, the cavity 83 enhances the flexibility of the spoiler 72 relative to the base 76 to efficiently utilize airflow to generate downward force onto the wiper assembly 22 and thereby reduce wind lift. Further, the cavity 83 enables the base 76 to flex in a downward position, toward the elongated beam 38 during operational movement, thereby further utilizing airflow to generate downward force onto the wiper assembly 22 for reduced wind lift. Accordingly, the cavity 83 cooperates with and further enhances the spoiler 72, leading edge 78, and other structure of the beam blade windshield wiper assembly 22 of the present invention.

Referring to FIGS. 2 and 3, the wiper assembly 22 of the present invention further includes a pair of end caps, generally indicated at 84. The end caps 84 are adapted to operatively engage the distal ends 56, 58 of the airfoil 54. The end caps 84 include a profile that substantially mimics the contours of the airfoil 54 to maintain the wind lift characteristics of the wiper assembly 22 and to provide an increased aesthetic value. The end caps 84 include a closed end 86 that covers the distal ends 56, 58, thereby preventing infiltration of water, ice, and debris within the space 82, cavity 83 and sleeve 70, which may prevent proper operation of the wiper assembly 22. The closed end 86 of the end caps 84 extend beyond the distal ends 56, 58 of the airfoil 54 to facilitate contact between the outer extremities of the rubber wiping element 26 and the surface to be wiped. More specifically, the end caps 84 provide a mass increase adjacent the distal ends 56, 58 of the airfoil 54 that prevent localized chatter along the extremities of the wiping element 26 caused by the combination of wind lift and a decrease in the force distributed to this area from wiper arm assembly 24 via the elongated beam 38, as described above.

Figure 5:
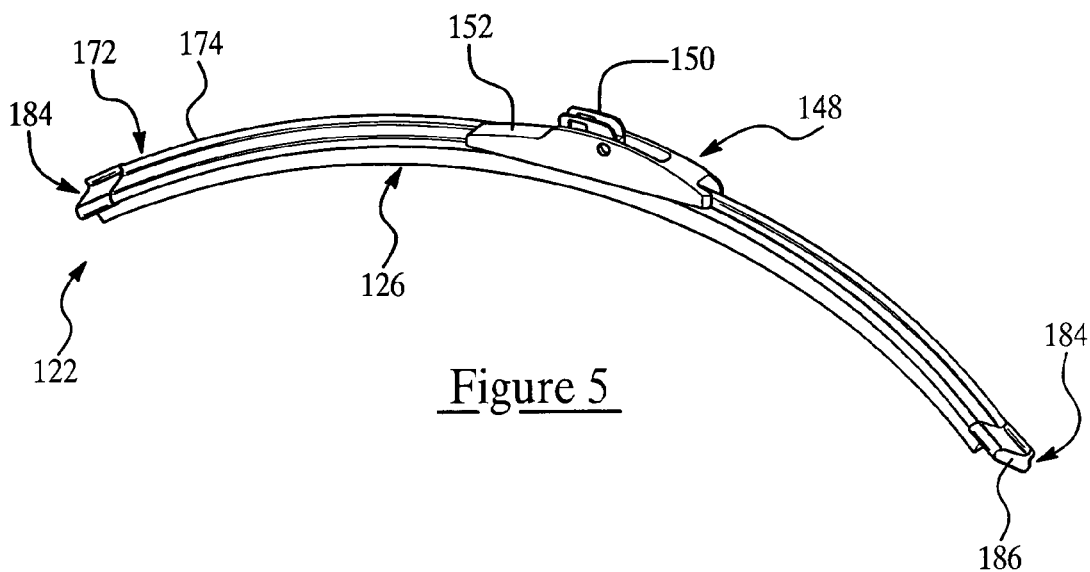
FIG. 5 is a perspective view of the beam blade wiper assembly according to another embodiment of the present invention.
Figure 6:
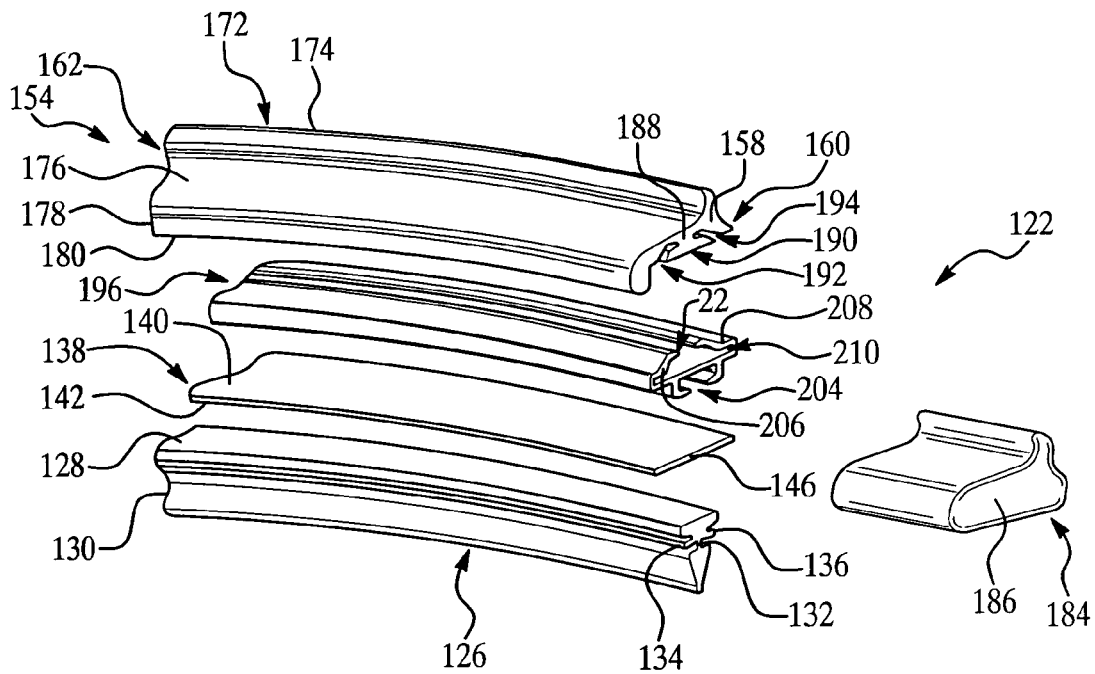
FIG. 6 is a fragmentary perspective view of a partially assembled beam blade wiper assembly according to another embodiment of the present invention.
Figure 7:
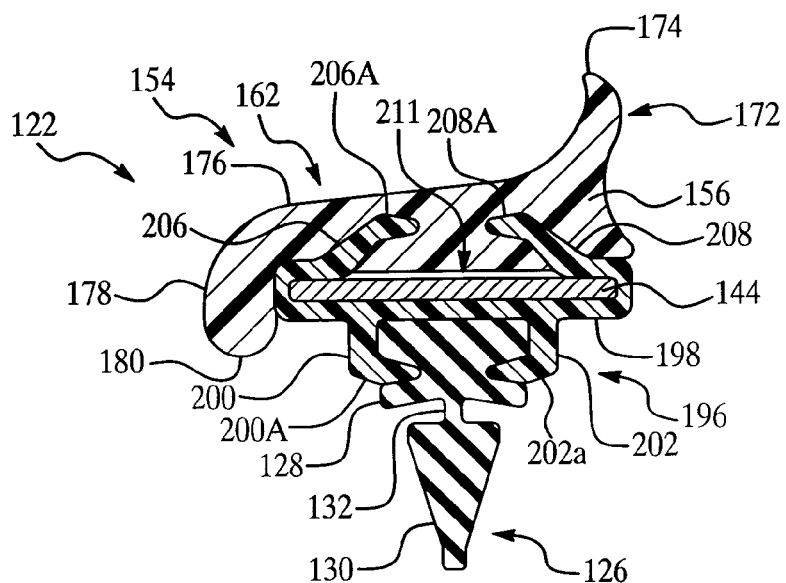
FIG. 7 is a cross-sectional view of the beam blade wiper assembly according to another embodiment of the present invention.

An alternative embodiment of the beam blade wiper assembly of the present invention is generally indicated at 122 in FIGS. 5-7 where like numerals, increased by 100 with respect to the embodiment of the invention illustrated in FIGS. 2-4, are used to designate like structure. The wiper assembly 122 of the present invention as shown in FIGS. 5-7 is substantially similar in structure to the wiper assembly 22 shown in FIGS. 2-4 and so the description of the assembly will not be repeated here except where expressly mentioned below. More specifically, the wiper assembly 122 includes a rubber wiping element 126, elongated beam 138, connecting member 148 and end caps 184 having the same structure as those described with respect to the embodiment illustrated in FIGS. 2-4. However, as will be described in greater detail below, the embodiment of the wiper assembly 122 illustrated in FIGS. 5-7 includes an airfoil 154 having slightly different structure than the airfoil 54 described relative to FIGS. 2-4.

Referring specifically to FIGS. 6 and 7, the airfoil 154 of the wiper assembly 122 includes an upper portion 162 extending between first and second distal ends 156, 158. The upper portion 162 includes a solid base 176 having a leading edge 178 that extends from the base 176 toward the rubber wiping element 126. The leading edge 178 further includes a terminal end 180 that acts to provide improved wind lift resistance as described above relative to the embodiment illustrated in FIGS. 2-5.

The upper portion 162 of the wiper assembly 122 further includes a spoiler 172 that extends from the base 176 in a manner opposite to the leading edge 178. The spoiler 172 is integrally attached to the upper portion 162 and includes a terminal point 174. The spoiler 172 is solid in cross-section and tapers from the base 176 toward the terminal point 174 so as to define a profile that is slightly contoured. The spoiler 172 illustrated in FIGS. 5-7 includes the same structure and provides the same functional advantages as the spoiler 72 described relative to the embodiment illustrated in FIGS. 2-4. Accordingly, the description of the spoiler 72 illustrated in FIGS. 2-4 is incorporated by reference relative to the spoiler 172 illustrated in FIGS. 5-7 as though fully set forth herein.

The airfoil 154 further includes an attachment portion 160. The attachment portion 160 is integrally formed relative to the upper portion 162 in the manner described above relative to the embodiment illustrated in FIGS. 2-4. The attachment portion 160 includes a tab 188 having a bulbous end 190 (FIG. 6). The attachment portion 160 further includes first and second tracks 192, 194 defined within the attachment portion 160 by the tab 188 (FIG. 6). The tab 188 and tracks 192, 194 are adapted to operatively engage a retainer, as will be described in greater detail below. Those having ordinary skill in the art will appreciate that while the attachment portion 160 includes a tab 188 and tracks 192, 194 to engage a retainer, the attachment portion 160 may include additional or alternative structure to accomplish this end.

Referring to FIGS. 5 and 6, the wiper assembly 122 further includes a retainer, generally indicated at 196. The retainer 196 is constructed from a resiliently flexible material and manufactured by an extruding process. Those having ordinary skill in the art will appreciate that the retainer 196 may be constructed from the same material employed to construct the airfoil 154 or may be constructed from another material having the desired resiliency and flexibility characteristics. By way of example the material may be a thermoplastic (poly) ethylene or thermoplastic olefin. Additionally, those having ordinary skill in the art will appreciate that, while the retainer 196 of the present invention is manufactured by an extruding process, other manufacturing techniques may be employed to manufacture the retainer 196. By way of example, the retainer 196 may be manufactured by an injecting thermoplastic material into a mold cavity.

Referring to FIGS. 6 and 7, the retainer 196 is adapted to operatively couple the rubber wiping 126 element to the airfoil 154 and retain the elongated beam 138. More specifically, the retainer 196 includes a plate 198 and pair of legs 200, 202 depending from the plate 198 to operatively engage the rubber wiping element 126. Each of the legs 200, 202 include a chamfered end 200A, 202A that is turned inward toward the other such that the legs 200, 202 and the plate 198 cooperate to define a sleeve 204. As shown in FIG. 6, the sleeve 204 operatively receives a portion of the upper section 128 of the rubber wiping element 126 while the chamfered ends 200A, 202A of the legs 200, 202 operatively engage the first and second tracks 134, 136 to retain the rubber wiping element 126.

The retainer 196 further includes a pair of arms 206, 208 extending from the plate 198 in a manner opposite the legs 200, 202. The arms 206, 208 and the plate 198 cooperate to define a space 210 (FIG. 6). The space 210 is adapted to operatively receive the elongated beam 138 (FIG. 7). Each of the arms 206, 208 include a chamfered end 206A, 208A that is turned inward toward each other that cooperate with the elongated beam 138 to define a passage 212 (FIG. 6). The passage 212 is adapted to operatively receive the bulbous end 190 of the tab 188 (FIG. 7).

Referring specifically to FIG. 7, the attachment portion 160 is spaced from the elongated beam 138 to define a cavity 211. The cavity 211 is adapted to provide increased flexibility between the airfoil 154 and the retainer 196 during operational movement of the wiper assembly 122 across the windshield 18. Specifically, during operational movement of the wiper assembly 122, the cavity 211 enhances the flexibility of the spoiler 172 relative to the base 176 to efficiently utilize airflow to generate downward force onto the wiper assembly 122 and thereby reduce wind lift. More specifically, the cavity 211 enables the tab 188 to flex within the passage 212, thereby improving the flexibility of the spoiler 172 as it is contacted by airflow. In this manner, the flexibility between the tab 188 and the retainer 196 provided by the cavity 211 further enables the structure of the upper portion 162 of the airfoil 154 to utilize the airflow to generate downward force onto the wiper assembly 122 for reduced wind lift.

The beam blade wiper assembly 22, 122 includes an airfoil 54, 154 having an upper portion 62, 162 to utilize airflow to generate downward force on the rubber wiping element 26, 126. Accordingly, the present invention improves contact between the wiping element 26, 126 and the windshield 18 and reduces wind lift for improved wiping performance. Further, the beam blade wiper assembly 22, 122 includes an airfoil 54, 154 that is solid in cross-section. Accordingly, the present invention is simpler to manufacture and thereby reduces associated manufacturing costs. Still further, the beam blade wiper assembly 22, 122 includes a cavity 83, 211 that increases flexibility of the airfoil 54, 154. Accordingly, the present invention increases utilization of the airfoil 54, 154 to generate downward pressure onto the wiping element 26, 126 to further reduce the likelihood of wind lift.

The present invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A beam blade windshield wiper assembly comprising:
   a rubber wiping element adapted to contact a surface to be wiped;
   an elongated beam having first and second longitudinal ends and lateral outside edges facing away from one another between said first and second longitudinal ends, said beam being of a resiliently flexible material to apply a force from an intermediate position between said first and second longitudinal ends to said first and second longitudinal ends;
   a retainer including a plate, a pair of legs depending from said plate to operatively engage a portion of said rubber wiping element and a pair of arms extending from said plate in a direction opposite to said legs and wrapping around and engaging said lateral outside edges of said beam so as to retain said beam in the lateral direction, said arms cooperate with said plate to define a space that is operatively engaged by said elongated beam; and
   an airfoil having an attachment portion and an upper portion extending between first and second distal ends, said attachment portion is integrally attached to said upper portion and is operatively attached to said retainer, said upper portion including a solid base having a leading edge that extends from said base toward said wiping element and a spoiler that is solid in cross-section and extends from said base in a manner opposite to said leading edge,
   wherein said attachment portion, said retainer and said elongated beam cooperate to define a cavity adapted to provide flexibility between said airfoil and said retainer during operational movement across the surface to be wiped.

2. The wiper assembly as set forth in claim 1 wherein said attachment portion includes a tab having a bulbous end and first and second tracks defined within said attachment portion by said tab, said tracks are adapted to operatively retain said arms.

3. The wiper assembly as set forth in claim 2 wherein each of said arms include an chamfered end that is turned inward toward the other such that said arms cooperate with said elongated beam to define a passage that operatively receives said bulbous end to operatively attach said airfoil to said retainer.

4. The wiper assembly as set forth in claim 1 wherein said leading edge further includes a terminal end that acts to direct air flow toward said spoiler.

5. The wiper assembly as set forth in claim 1 wherein said beam includes a constant width that extends axially within said space such that said longitudinal ends are substantially aligned with said distal ends.

6. The wiper assembly as set forth in claim 1 wherein each of said legs include a chamfered end that is turned inward toward the other such that said legs and said plate cooperate to define a sleeve adapted to retain said rubber wiping element.

7. The wiper assembly as set forth in claim 1 wherein said spoiler is integrally attached to said upper portion and tapers from said base toward a terminal point to define a profile that is slightly contoured.

8. The wiper assembly as set forth in claim 1 further includes a connecting member operatively attached to said airfoil at an intermediate position between said first and second distal ends to operatively engage an attachment member of a wiper arm.

9. The wiper assembly as set forth in claim 1 further includes a pair of end caps adapted to operatively engage said distal ends of said airfoil, said end caps including a profile that substantially mimics the contours of said airfoil.

10. The wiper assembly as set forth in claim 9 wherein said end caps include a closed end that extends beyond said distal ends of said airfoil to facilitate contact between said rubber wiping element and the surface to be wiped.

* * * * *